(12) United States Patent
Iwaguchi et al.

(10) Patent No.: US 6,247,646 B1
(45) Date of Patent: Jun. 19, 2001

(54) BAR CODE READER, AND BAR CODE READING METHOD

(75) Inventors: Isao Iwaguchi; Hiroaki Kawai; Mitsuo Watanabe; Kozo Yamazaki, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/494,364

(22) Filed: Jan. 31, 2000

(30) Foreign Application Priority Data

Jun. 14, 1999 (JP) .................................................. 11-167155

(51) Int. Cl.⁷ ....................................................... G06K 7/10
(52) U.S. Cl. .................................. 235/462.04; 235/462.16
(58) Field of Search ........................... 235/462.04, 462.16

(56) References Cited

U.S. PATENT DOCUMENTS 5,453,600 * 9/1995 Swartz ............................. 235/462.04

* cited by examiner

*Primary Examiner*—Harold I. Pitts
(74) *Attorney, Agent, or Firm*—Armstrong, Westerman, Hattori, McLeland & Naughton, LLP

(57) ABSTRACT

A bar code reader for reading a bar code 30 composed of a plurality of white bars and a plurality of black bars, includes a generating unit 8 for generating bar width values respectively showing a width of the read bars, a judging unit 12 for judging based on the bar width values whether or not the read bar code satisfies a predetermined standard condition, and a converting unit 12 for converting the read bars into a plurality of bars in which a black-and-white-inverted bar is interposed between the conversion-target color bars. If the judging unit judges that the bar code does not satisfy the predetermined standard condition, the converting unit converts any one of the white and black bars constituting the bar code, and thereafter the judging unit makes a re-judgement. The bar code reader is capable of demodulating the bar code which has been abnormally read by presuming and compensating the bars read apparently as a single bar to a plurality of bars.

14 Claims, 12 Drawing Sheets

FIG.5

S409: MODULE COMPENSATING PROCESS

FROM S404 (ABNORMAL)

FROM S410 (NO)

S501: INCREMENT POINT FOR POINTING LOCATION FOR STORING 3-MODULE BAR WIDTH DATA IN RAM 121

S502: DECOMPOSE 3-MODULE BAR WIDTH DATA INTO THREE LENGTHS OF 1-MODULE BARS (THREE BARS)

S503: EXECUTE START CODE CHECK, CENTER BAR CHECK, END CODE CHECK AND CHARACTER LENGTH CHECK

S504: ARE ALL CHECKS IN S503 NORMAL ?

NO → TO S410

YES → TO S405

BAR CODE READER, AND BAR CODE READING METHOD

BACKGROUND OF THE INVENTION

The present invention relates to a bar code reader and a bar code reading method for reading a bar code by irradiating the bar code with light beams and detecting a change in intensity of reflected light beams, and demodulating the bar code into data.

As typified by a POS (Point of Sales) system in a distribution sector over the recent years, it has been generalized that the merchandises are managed by bar codes. For instance, according to the POS system in a shop, pieces of data such as categories and sales prices of the goods are coded in a bar code format, and printed or pasted onto the goods. Then, the bar code of the goods is read at a cash register in a payment location, whereby the number of goods sold is added up in real time as well as doing the payment of a charge. This serves for a stock management and a purchase management.

By the way, the bar code described above is roughly classified into a fixed length code such as a WPC code, UPC code, an EAN code and a JAN code, and a variable length second code. This variable length code is categorized as a code in which a length (the number of bars) is not fixed in terms of standard. For example, an ITF (Interleaved Two of Five) code, CODE 39, NW 7 and CODE 128 may be exemplified. The fixed length code has such a structure that guard bars (GB) are added to both of side ends, a center bar (CB) is inserted in an intermediate area therebetween, and pieces of character data for 4 or 6 characters are interposed between each guard bar and the center bar. In this structure, even when only the first half character data are read, this set of character data are interposed between the guard bar (LGB) at the left side end and the center bar, and can be therefore recognized as the data constituting the bar code. Similarly, even when only the second half character data are read, this set of character data are interposed between the guard bar (RGB) at the right side end and the center bar, and can be therefore recognized as the data constituting the bar code. Accordingly, the read data of the whole bar code can be synthesized based on the data obtained by separately reading the first half data characters and the second half data characters.

A bar code reader for reading the thus structured bar code is roughly classified into a fixed type reader used for comparatively small goods formed with the bar codes, and a handy type reader used for comparatively large goods. The fixed type bar code reader thereof is provided with a mechanism for scanning the bar code in a multiplicity of directions by irradiating the bar code with light beams for reading so that an operator is capable of reading the bar code without being so aware of a bar code direction. More specifically, the bar code is scanned in the multiplicity of directions with the laser beams defined as reading irradiation light beams during a scan by one reflection surface of a polygon mirror used in combination with fixed reflection mirrors. Then, during such a scan process, the laser beams reflected from the surface of the goods are received, and a demodulation processing circuit demodulates change-of-intensity data (reflected light data) of the thus received reflected laser beams with a demodulation algorithm for the bar code and extracts data coded into the bar code.

The fixed type bar code reader described above has been requested to be more sophisticated with a high performance so that it is capable of precisely reading the bar code even when the goods passes therethrough at a high speed (a high moving speed with respect to the reader). For attaining this, there is made an attempt of enhancing a probability (a bar code scanning probability) at which the laser beams hit the bar code of the goods passing above the bar code reader by increasing a laser scanning speed with high-speed rotations of the polygon mirror. It is required for performing the high-speed scan described above that the number of rotations of a driving motor for the polygon mirror be increased. With this increase in the number of rotations of the motor, however, an electric current consumed might increase, which needs a power supply device having a large current capacity. Besides, a binarizing circuit is required to be mounted with a high-performance IC capable of responding to a high-frequency characteristic of an analog system circuit. These requirements might be factors for large increases in the car code reader itself and related equipment as well. Accordingly, it is a present situation that the great majority of bar code readers do not adopt the high-speed scanning method explained above. As a result, there arises a problem inherent in the conventional bar code reader, wherein the number of reading processes over the bar code is not sufficient, and the data of the bar code can be read approximately only once at the maximum if the goods passes therethrough at a high speed.

Further, in the prior art bar code reader, a slice level (a threshold value) for outputting white/black edge signals (WEG, BEG) when over a predetermined voltage, is provided as a criterion for judging whether black-and-white binarization is executed or not. This slice level is set comparatively high in order to prevent noises caused by ruggedness on the surface of the goods from being outputted as edge signals due to an influence by circuit noises.

In the thus constructed bar code reader, in the case of a bar coder with a low PCS value (a difference between black and white reflectance ratios) and a colored bar code, and if a passing distance between a bar code reading unit of the reader and the goods is large, a return light quantity of the reflected light decreases. With this decrease, an amplitude of a black-white changing waveform becomes small enough to be under the slice level, and consequently this might be judged as a nose, with the result that the edge signal is not outputted. Furthermore, in an area where the amplitude is small even if slightly over the slice level, an S/N ratio is poor, and the amplitude is under the slice level due to the influence by the circuit noises etc. This might lead to a case where the edge signal is not outputted.

Furthermore, if conditions for inducing the problems described above are overlapped, an amplitude of a differential signal a photoelectric conversion waveform corresponding to the bar code decreases under the slice level, with the result that plural lengths of bars appear as one length of bar. This makes the bar code data unable to be precisely extracted and demodulated.

SUMMARY OF THE INVENTION

Accordingly, it is a primary object of the present invention to provide a bar code reader and a bar code reading method which are capable of demodulating a bar code that has been abnormally read, by presuming and compensating bars read apparently as one length of bar to plural lengths of bars.

To accomplish this object, according to a first aspect of the present invention, a bar code reader for reading a bar code composed of a plurality of white bars and a plurality of black bars, comprises a generating unit for generating bar width values respectively showing a width of the read bars, a judging unit for judging based on the bar width values whether or not the read bar code satisfies a predetermined standard condition, and a converting unit for converting the read bars into a plurality of bars in which a black-and-white-inverted bar is interposed between the conversion-target color bars, when the judging unit judges that the bar code does not satisfy the predetermined standard condition. The judging unit makes a re-judgement of the bar code in which the read bar is converted.

In the bar code reader according to the first aspect of the invention, the converting unit may convert the conversion-target bar into a plurality of bars each corresponding to a width of a multiple of a basic minimum unit width. Further, the converting unit may make the conversion effective if the plurality of converted bars do not correspond to any one of a start guard bar, a center bar and an end guard bar of the bar code. Still further, the converting unit may set an area for the conversion into the plurality of bars to only one area of the bar code.

According to a second aspect of the present invention, a bar code reader for reading a bar code composed of a plurality of white bars and a plurality of black bars, comprises a generating unit for generating bar width values respectively showing a width of the read bars, and a judging unit for making a judgement of a pattern of the read bar code that the read pattern is an area corresponding to a center bar of the bar code in a case where the read pattern has one single white bar and one single black bar each having a basic minimum unit width, and a white bar or a black bar having a width that is three times as large as the basic minimum unit width.

According to a third aspect of the present invention, a bar code reader for reading a bar code composed of a plurality of white bars and a plurality of black bars, comprises a generating unit for generating bar width values respectively showing a width of the read bars, and a judging unit for making a judgement of a pattern of the read bar code that the read pattern is an area corresponding to a center bar of the bar code in a case where the read pattern has two white bars each having a basic minimum unit width, and a black bar having a width that is three times as large as the basic minimum unit width.

In the bar code reader according to the second or third aspect of the invention, the black bar is interposed between the two white bars. If the judgement by the judging unit is made effective when a whole bar code is read by a single scan. Further, if the judgement by the judging unit is made effective when a section of a bar code between a start guard bar and the center bar, or a section of a bar code between the center bar and an end guard bar is read by a single scan.

According to a fourth aspect of the present invention, a bar code reader for reading a bar code by receiving reflected light beams from the bar code having bright areas and dark areas, comprises a generating unit for generating a bright/dark pattern signal having an amplitude corresponding to a quantity of the light received, a first detecting unit for detecting a first point of change from the bright area to the dark area of the bright/dark pattern signal, and a second point of change from the dark area to the bright area of the bright/dark pattern signal, a second detecting unit for detecting whether or not the first point of change or the second point of change is consecutively detected, and a converting unit for converting a read bar corresponding to the consecutively detected points of change into a plurality of bars in which a black-and-white-inverted bar is interposed between the conversion-target color bars, when the second detecting unit consecutively detects the first point of change or the second point of change.

According to a fifth aspect of the present invention, a bar code reading method of reading a bar code composed of a plurality of white bars and a plurality of black bars, comprises a first step of generating bar width values respectively showing a width of the read bars, a second step of judging based on the bar width values whether or not the read bar code satisfies a predetermined standard condition, and a third step of converting the read bars into a plurality of bars in which a black-and-white-inverted bar is interposed between the conversion-target color bars, when judging in said second step that the bar code does not satisfy the predetermined standard condition. A re-judgement of the bar code in which the read bar is converted is made in the second step.

According to a fixth aspect of the present invention, a bar code reading method of reading a bar code composed of a plurality of white bars and a plurality of black bars, comprises a first step of generating bar width values respectively showing a width of the read bars, and a second step of making a judgement of a pattern of the read bar code that the read pattern is an area corresponding to a center bar of the bar code in a case where the read pattern has one single white bar and one single black bar each having a basic minimum unit width, and a white bar or a black bar having a width that is three times as large as the basic minimum unit width.

According to a seventh aspect of the present invention, a bar code reading method of reading a bar code composed of a plurality of white bars and a plurality of black bars, comprises a first step of generating bar width values respectively showing a width of the read bars, and a second step of making a judgement of a pattern of the read bar code that the read pattern is an area corresponding to a center bar of the bar code in a case where the read pattern has two white bars each having a basic minimum unit width, and a black bar having a width that is three times as large as the basic minimum unit width.

According to an eighth aspect of the present invention a bar code reading method of reading a bar code by receiving reflected light beams from the bar code having bright areas and dark areas, comprises a first step of generating a bright/dark pattern signal having an amplitude corresponding to a quantity of the light received, a second step of detecting a first point of change from the bright area to the dark area of the bright/dark pattern signal, and a second point of change from the dark area to the bright area of the bright/dark pattern signal, a third step of detecting whether or not the first point of change or the second point of change is consecutively detected, and a fourth step of converting a read bar corresponding to the consecutively detected points of change into a plurality of bars in which a black-and-white-inverted bar is interposed between the conversion-target color bars, when the first point of change or the second point of change is consecutively detected in the third step.

The bar code reader and the bar code reading method according to the present invention are capable of saving what is processed as an abnormal state of reading because of the bar code being unable to be read when an object (goods) is passed (move) through at a high speed. As a result, there is enhanced a bar code reading rate when the object is passed at the high speed.

Further, according to the present invention, it is feasible to save what is processed as an abnormal state of reading the bar code in such a case that a distance between the bar code reader and the object to be passed therethrough is not proper. As a consequence, a reading area of the bar code expands.

BRIEF DESCRIPTION OF THE DRAWINGS

These objects and advantages of this invention will become more apparent and more readily appreciated from the following detailed description of the presently preferred exemplary embodiments, taken in conjunction with the accompanying drawings of which:

FIG. 5 is a flowchart showing a first module compensating process in the bar code recognizing/demodulating process shown in FIG. 4;

DETAILED DESCRIPTION OF THE PREFERRED EMBODIMENTS

<Construction of Bar Code Reader>

Figure 1:
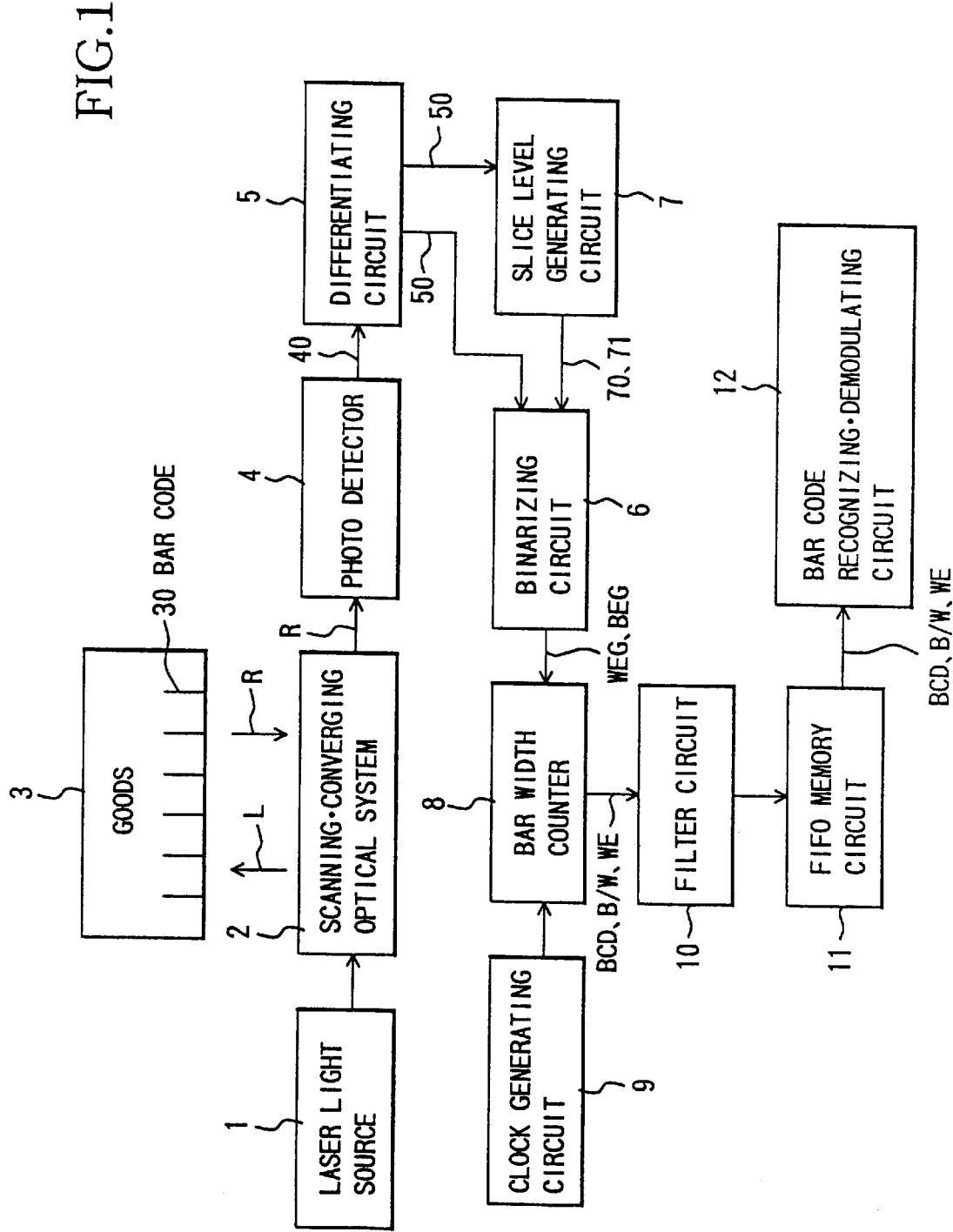
FIG. 1 is a block diagram showing a construction of a bar code reader in one embodiment of the present invention.

FIG. 1 shows a construction of a bar code reader in one embodiment of the present invention. Referring to FIG. 1, a laser light source 1 is classified as a semiconductor laser for emitting laser beams L. The laser beams L emitted from the laser light source 1 are incident on a scanning/converging optical system 2. The scanning/converging optical system 2 has a polygon mirror for deflecting the laser beams L, and a plurality of fixed mirrors for reflecting the deflected laser beams L in a plurality of directions. In the scanning/converging optical system 2, the laser beams L are emitted for consecutive scanning in the plurality of directions upwards of the scanning/converging optical system 2, within a period of the deflection by one reflection surface of the polygon mirror. When the thus scanning laser beams L impinge upon a surface of a goods 4, the laser beams L are irregularly reflected from the surface thereof, and some of reflected laser beams R travel back to the scanning/converging optical system 2. The scanning/converging optical system 2 inputs the reflected laser beams R to a photo detector 4. The photo detector 4 is classified as a photo diode covered with a filter which transmits only the light having the same wavelength as that of the laser beam L (the reflected laser beam R), and outputs an electric current corresponding to a change in intensity of the reflected laser beam R.

A differentiating circuit 5 outputs to a binarizing circuit a differential signal (precisely, a voltage signal of a single differentiation) having an amplitude corresponding to a current signal level at a rising point and a falling point of the current signal corresponding to a change in intensity of the reflected laser beam R which is outputted from the photo detector 4, i.e., at a point of change from a black bar (a dark area) to a white bar (a bright area) of a bar code (including a margin) and at a point of change from the white bar to the black bar thereof. Note that an amplifier circuit for amplifying the current signal outputted from the photo detector 4 at a predetermined level, might be provided anterior to the differentiating circuit 5.

The binarizing circuit 6 compares the differential signal given from the differentiating circuit 5 with first and second slice levels given from a slice level generating circuit 7 which will hereinafter be explained later on. The binarizing circuit 6, when the amplitude of the differential signal exceeds the first slice level, outputs a white edge pulse WEG indicating the point of change (a white edge) from the black bar to the white bar of the bar code and, when the amplitude of the differential signal exceeds the second slice level, outputs a black edge pulse BEG indicating the point of change (a black edge) from the white bar to the black bar of the bar code. The white edge pulse WEG and the black edge pulse BEG are rectangular signals that change from a logic [H(1)] level to a logic [L(0)] level at the point of change.

The slice level generating circuit 7 generates voltage signals assuming the first and second slice levels, which are inputted to the binarizing circuit 6. The first slice level is defined as a plus (+) level threshold value for detecting the white edge in the binarizing circuit 6, while the second slice level is defined as a minus (−) level threshold value for detecting the black edge. The slice level generating circuit 7, which obtains a peak hold of the differential signal outputted from the differentiating circuit 5, variably sets, when the amplitude of the differential signal is large, the first and second slice levels corresponding to this amplitude and, when the amplitude of the differential signal is small, operates to fix the first and second slice levels at a predetermined level (e.g., ±300 mV)

A bar width counter 8, based on the white and black edge pulses WEG, BEG inputted from the binarizing circuit 6, measures a period of time from a timing of the white edge pulse WEG to a timing of the black edge pulse WEG (which corresponds, it is expected, to a width of the white bar in a bar code 30), and a period of time from the timing of the black edge pule BEG to the timing of the white edge pulse WEG (which corresponds, it is expected, to a width of the black bar in the bar code 30). Then, the bar width counter 8 counts the number of clock pulses from the clock generating circuit 9 for measuring periods of time corresponding to these bar widths, and outputs to a filter circuit 10 bar width count values BCD indicating count values corresponding to those bar widths. The bar width counter 8, simultaneously with the outputting of these bar width count values, outputs to the filter circuit 10 a color identifying signal B/W for indicating whether the bar is the black bar or the white bar. The color identification can be done based on input states of the white edge pulse WEG and the black edge pulse BEG. Accordingly, the circuit for the color identification is constructed of, e.g., a flip-flop circuit for inputting respectively the white edge pulse WEG and the black edge pulse BEG, and outputting the logic level [H(1)] signal and the logic level [L(0)] signal corresponding to those edge pulses. Further, the bar width counter 8, when any one of the white and black edge pulses WEG, BEG is inputted consecutively twice from the binarizing circuit 6 which are to be inputted alternately in the case of normally reading the bar code 30, transmits a wave error signal WE as an abnormal signal to the filter circuit 10. In this embodiment, the wave error signal WE is utilized when in a fifth bar code compensating process which will hereinafter be explained.

The filter circuit 10 logically judges each count value BCD inputted from the bar width counter 8. The filter circuit 10 eliminates the count value (e.g., a count value corresponding to futile data generated when scanning a design area peripheral to the bar code of the goods) indicating a change in intensity due to a factor apparently other than the reflected laser beam R from the bar code 30, extracts what has a high probability of being the bar width count value BCD indicating each bar width of the bar code 30, and transfers the extracted count values together with the color identification signal B/W to a FIFO memory circuit 11 disposed posterior thereto. The futile data eliminating operation by the filter circuit 10 contributes to relieve a load and enhance an accuracy of a demodulating process in a bar code recognizing/demodulating circuit 12 which will be mentioned later on.

The FIFO memory circuit 11 is a FIFO memory for temporarily holding the bar width count values BCD passing though the filter circuit 10 and the color identification signals B/W added thereto, and outputting the bar width count values BCD and the color identification signals B/W in accordance with the sequence held therein, and functions as a buffer. The FIFO memory circuit 11 has a buffer function of avoiding, if a large quantity bar width count values BCD occur for a short period of time, a memory overflow caused when the bar code recognizing/demodulating circuit 12 does not catch up with its due demodulating process, i.e., avoiding an incomplete storage of the bar width count values BCD.

The bar code recognizing/demodulating circuit 12 is defined as a processor for executing a predetermined recognizing/demodulating process program with respect to the bar width count values BCD read from the FIFO memory circuit 11, and fetching various categories of data coded into the bar code.

(Detailed Construction of Bar Code Recognizing/Demodulating Circuit)

Figure 2:
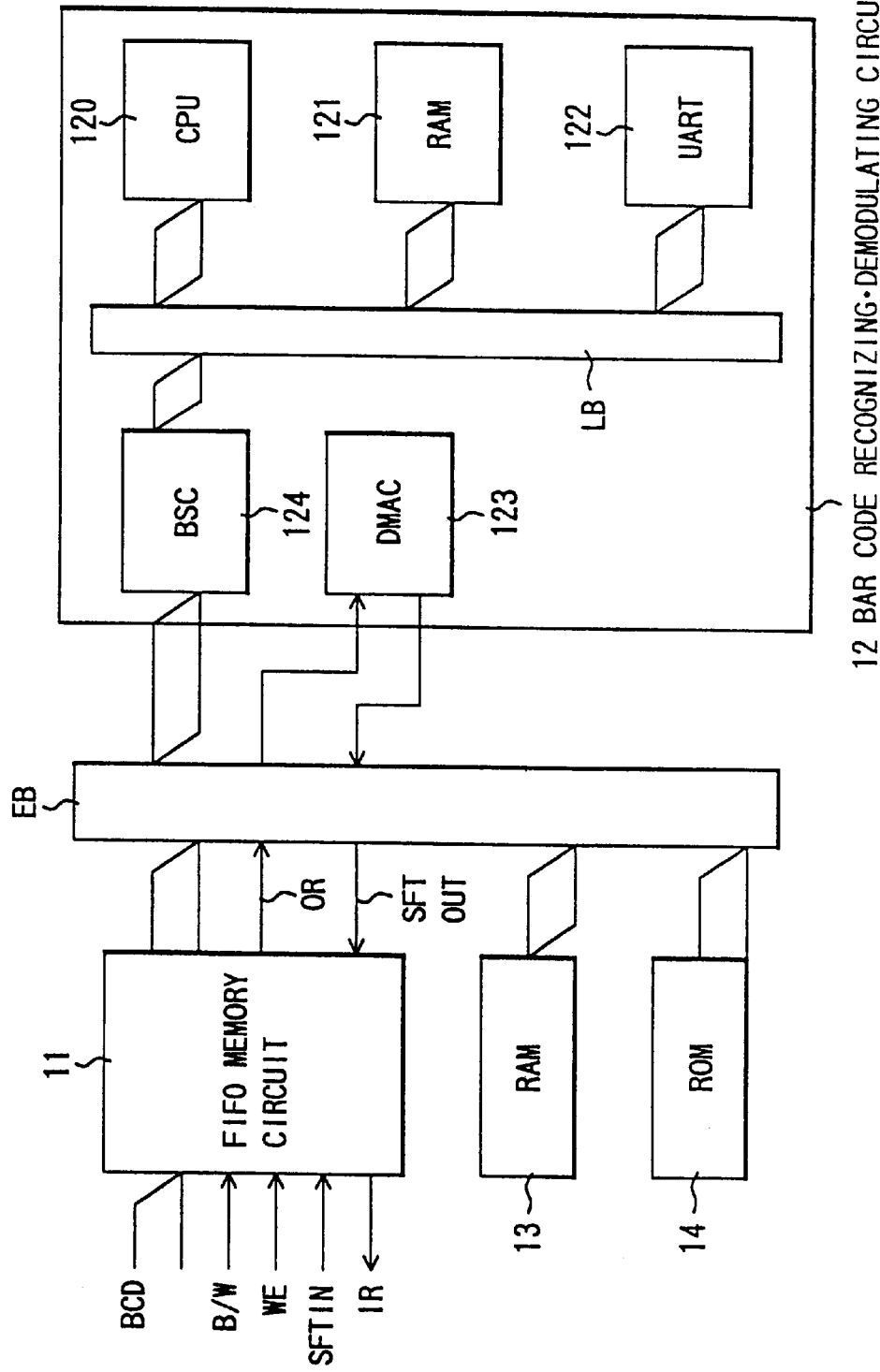
FIG. 2 is a block diagram showing a detailed configuration of a bar code recognizing/demodulating circuit in FIG. 1.

Herein, a detailed construction of the bar code recognizing/demodulating circuit 12 will be described together with the FIFO memory circuit 11 disposed anterior thereto. Referring to FIG. 2, the FIFO memory circuit 11 is disposed anterior to the bar code recognizing/demodulating circuit 12. A signal BCD among I/O signals of the FIFO memory circuit 11 indicates a bar width count value outputted from a last-stage buffer among a plurality of buffers (not shown) constituting the filter circuit 10. Further, a signal B/W indicates a color identification signal representing a bar color (black/white) outputted from the last-stage buffer of the filter circuit 10. Moreover, a signal WE indicates a wave error signal outputted from the last-stage buffer of the filter circuit 10.

These signals are read by the FIFO memory circuit 11 when a signal (SFTIN) is transmitted from the filter circuit 10. Further, the FIFO memory circuit 11, when reading these signals, transmits a input-ready signal (IR) toward the bar width counter 8 (see FIG. 1). The FIFO memory circuit 11 and the bar code recognizing/demodulating circuit 12 disposed posterior thereto, are connected to each other via an external (16-bit) bus EB. Then, the FIFO memory circuit 11 outputs the bar width count value read first and the color identification signal B/W to the bar code recognizing/demodulating circuit 12 via the external bus EB, and transmits a signal (OR) for giving an indication to take in these signals, to the bar code recognizing/demodulating circuit 12. Subsequently, when the bar code recognizing/demodulating circuit 12 notifies the FIFO memory circuit 11 of a signal (SETOUT) indicating a completion of the take-in of those signals, the FIFO memory circuit 11 outputs the next bar width count value BCD and color identification signal B/W to the bar code recognizing/demodulating circuit 12.

Note that a RAM 13 and a ROM 14 serving as external memory circuits are connected to the external bus EB through which the FIFO memory circuit 11 and the bar code recognizing/demodulating circuit 12 are connected to each other. The RAM 13 is a random-access-memory for temporarily storing the data (the bar width count value BCD and the color identification signal B/W) transmitted from the FIFO memory circuit 11. Further the ROM 14 is a read-only memory for storing a variety of programs executed by a control circuit (which will hereinafter be explained) of the bar code recognizing/demodulating circuit 12.

The bar code recognizing/demodulating circuit 12 is constructed of a control circuit 120, a memory circuit (RAM) 121, a universal asynchronous receiver/transmitter (UART) 122 which are each connected by an internal (32-bit) bus L, a direct memory access controller (DMAC) 123, and a bus state controller (BSC) 124 connected between the internal bus LB and the external bus EB. The control circuit (CPU) 120 composed of a RISC chip controls the whole bar code recognizing/demodulating circuit 12, and executes a process of recognizing and demodulating the bar code based on the bar width count value BCD and the color identification signal B/W transmitted from the FIFO memory circuit 11. The bus state controller (BSC) 124 is an I/O interface for controlling states of the internal bus LB and off the external bus EB. The direct memory access controller (DMAC) 123, upon an input of the signal (OR) for giving the indication to take in the signal from the FIFO memory circuit 11, temporarily takes into the external RAM 13 the data of the bar width count value BCD and the color identification signal B/W transmitted from the FIFO memory circuit 11. The DMAC 123 thereafter controls the bus state controller 124 to transfer these pieces of data in order to store the data in an internal RAM 121 having a smaller capacity than the RAM 13. Upon a completion of this transfer, the DMAC 123 transmits the signal (SETOUT) indicating the completion of the take-in of the data back to the FIF memory circuit 11. The universal asynchronous receiver/transmitter (UART) 122 is a parallel/serial interface for converting, into a serial signal, character data (demodulated bar code data) demodulated as parallel data, and outputting the serial signal to an external POS via a unillustrated RS-232C port.

<Operation of Bar Code Reader>

An operation of the bar code reader taking the construction described above will be described referring to FIGS. 1, 2 and 3 in combination. When an operator switches ON a power supply of the bar code reader, the laser beams L emitted from the laser light source 1 scan the bar code 30 in a multiplicity of directions through the scanning/converging optical system 2. When the operator puts the surface, formed with the bar code 30, of the goods 3 above the scanning/converging optical system 2 or passes (moves) it through above the optical system 2, this surface is scanned. Then, when the laser beams L impinge upon a white bar (a bright area) and a black bar (a dark area) of the bar code 30 formed on this surface of the goods 3, the reflected laser beams R corresponding to the bar colors travel back to the scanning/converging optical system 2 and are received by the photo detector 4.

According to UPC, EPC and JAN codes, a basic minimum unit (minimum width) of the bar width is set as one module, and a maximum width of the bar forming the bar code has 4 modules. Further, one character is composed of two lengths of black bars and two lengths of white bars, and a width of one character has 7 modules. For example, as shown in FIG. 3(A), the bar code 30 of the goods 3 is composed of a 3-module black bar Ba, a 3-module white bar Wa, a 1-module black bar Bb, a 1-module white bar Wb, a 1-module black bar Bc, a 1-module white bar Wc, a 2-module black bar Bd, and a 3-module white bar Wd. In this case, the respective bars are sequentially irradiated with the laser beams L emerging from the scanning/converging optical system 2, and the reflected laser beams R corresponding to the bar width and the bar color travel back to the scanning/converging optical system 2, and are received by the photo detector 4. As a result, an photoelectric conversion waveform 40 of the photo diode constituting the photo detector 4 becomes as shown in FIG. 3(B). As shown in FIG. 3(B), the laser beams L falling upon the bar code 30 are reflected in the white-bar areas but absorbed in the black bar areas, and therefore a level of the photoelectric conversion waveform 40 decreases in the black bar light-irradiated area.

The photoelectric conversion waveform 40 described above is inputted to the differentiating circuit 5 from the photo detector 4 in the scanning sequence over the bar code 30. The differentiating circuit 5 outputs a differential signal 50 having an amplitude assuming a minus (−) level and a plus (+) level at a falling point (corresponding to the black edge) and a rising point (corresponding to a white edge) of the photoelectric conversion waveform 40. The differential signal 50 indicated by the dotted line at a timing T4 is in an output state when the bar code is abnormally read, and a compensating method thereof will hereinafter be explained in details.

The binarizing circuit 6, based on a (+) slice level 70 and a (−) slice level 71 inputted from the slice level generating circuit 7, judges an amplitude of each differential signal 50 inputted from the differentiating circuit 5. As a result, if the amplitude of the differential signal 50 exceeds the (−) slice level 71, a rectangular signal showing the black edge defined as a point of change from the white bar to the black bar, is outputted as a black edge pulse BEG. Further, if the amplitude of the differential signal 50 exceeds the (+) slice level 70, a rectangular signal showing the white edge defined as a point of change from the black bar to the white bar, is outputted as a white edge pulse WEG. FIG. 3(D) shows a state where the black edge pulses BEG are outputted respectively at timings T1, T3, T5, T7, and the white edge pulses WEG are outputted respectively at the timings T2, T4, T6, T8. Note that when the differential signal 50 is in an output state corresponding to the timing T4 shown by the dotted line, the white edge pulse WEG at the timing T4 is not outputted from the binarizing circuit 6. The reason why so and the compensating method thereof will hereinafter be described in greater details.

The bar width counter 8, based on the black edge pulse BEG and the white edge pulse WEG inputted from the binarizing circuit 6, generates the color identification signal B/W, the bar width count value BCD and the wave error signal WE as shown in FIGS. 3(E), 3(F)and 3(G). The bar width counter 8 outputs the color identification signal B indicating the black bar assuming the logic [H(1)] level during a time-span till the white edge pulse WEG is inputted since the black edge pulse BEG has been inputted. Further, the bar width counter 8 outputs the color identification signal W indicating the white bar assuming the logic [L(0)] level during a time-span till the black edge pulse BEG is inputted since the white edge pulse WEG has been inputted. In this example, when the bar code is normally read, the color identification signals B/W, [B], [W] shown in FIG. 3(E) are alternately outputted. The bar width counter 8 counts the number of clock pulses inputted from the clock generating circuit 9 during a period from a point of time when the black edge pulse BEG is inputted from the binarizing circuit 6 to a point of time when the white edge pulse WEG is inputted, or a period from the point of time when the white edge pulse WEG is inputted from the binarizing circuit 6 to the point of time when the black edge pulse BEG is inputted. Then, the bar width counter 8 outputs data showing a result of counting as a bar width count value BCD to the filter circuit 10. In this example, when the bar code is normally read, there are outputted the bar width count values BCD, to be specific, [300, 300, 100, 100, 100, 100, 200, 300] in decimal-number representation shown in FIG. 3(F). In a real circuit, the bar width counter 8 outputs the bar width count values BCD in a binary decimal data format in which the decimal numbers are expressed in binary numbers. Note that the wave error signal WE will be explained in details later on.

As discussed above, the filter circuit 10 eliminates the bar width count values BCD and the color identification signal B/W outputted from the bar width counter 8 if the count values are those (e.g., the count values corresponding to futile data generated when scanning the design area peripheral to the bar code of the goods) indicating the change in intensity due to the factor obviously other than the reflected laser beams R from the bar code 30, and the count values having a high probability of being the bar width count values BCD indicating the respective bar widths of the bar code 30, are inputted together with the color identification signals B/W to the FIFO memory circuit 11 disposed posterior thereto. The FIFO memory circuit 11, which incorporates the buffer function in the event of an occurrence of a large quantity of bar width count values BCD in a short time, temporarily holds the bar width count values BCD passing through the filter circuit 10 and the color identification signals B/W added thereto.

The bar code recognizing/demodulating circuit 12 reads the bar width count value BCD and the color identification signal B/W from the FIFO memory circuit 11, the executes the predetermined recognizing/demodulating process program, and fetches various pieces of data coded into the bar code 30.

(Bar Code Recognizing/Demodulating Process)

Subsequently, the bar code recognizing/demodulating process in the bar code recognizing/demodulating circuit 12 will be explained. It is to be noted that the bar code recognizing/demodulating circuit 12, on the occasion of taking the bar width count value BCD and the color identification signal B/W into the internal RAM 121 from the FIFO memory circuit 11, as described above, after the direct memory access controller (DMAC) 123 temporarily has taken into the RAM 13 the data of the bar width count value BCD and the color identification signal B/W transmitted from the FIFO memory circuit 11, executes a process of transferring the same data for its being stored in the RAM 121 having a smaller capacity than the RAM 13 by controlling the bus state controller 124. In the following discussion, however, there will be omitted a detailed operation of transmitting and receiving the data and the signal related to what is now explained above.

Figure 3:
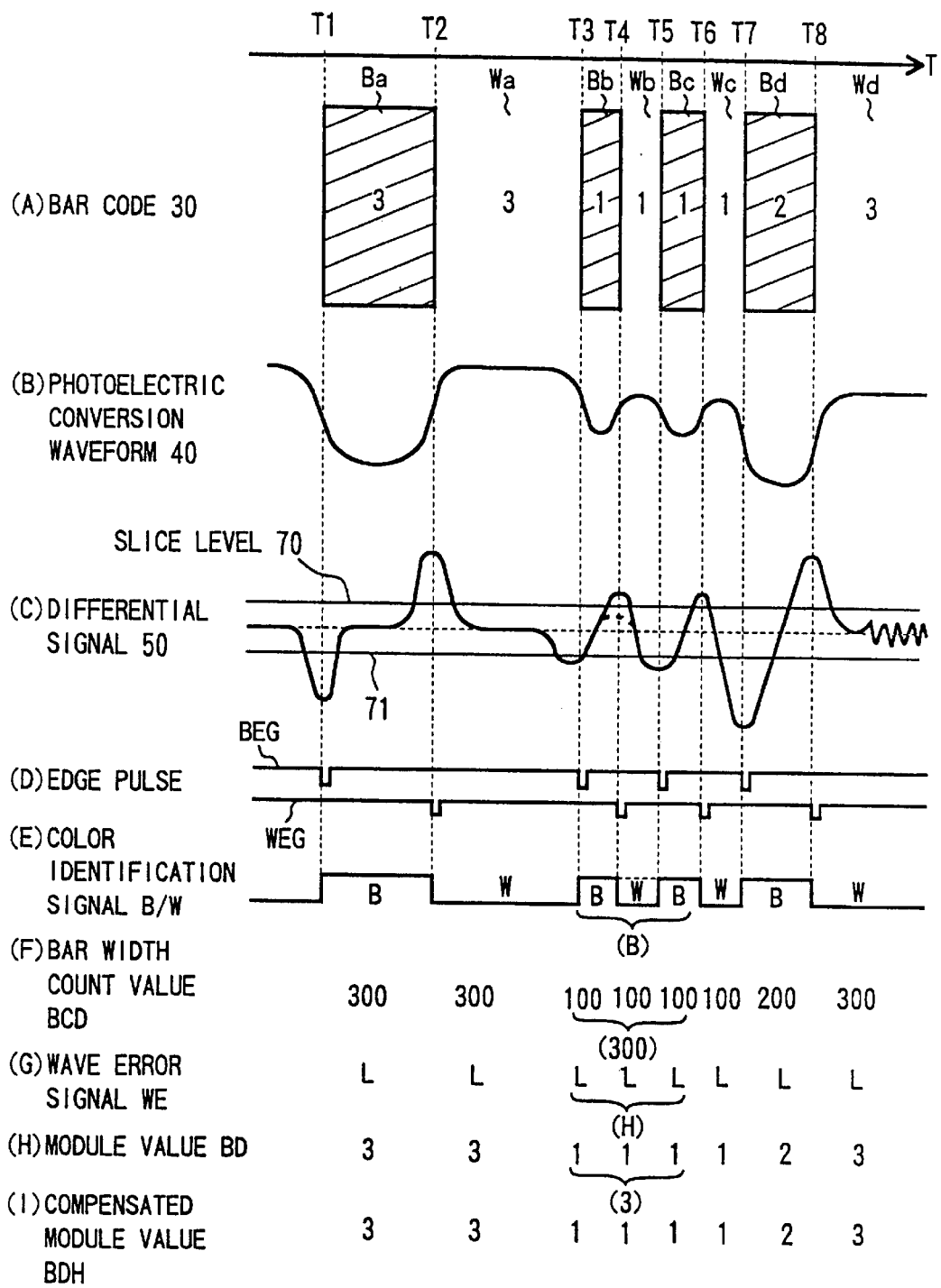
FIG. 3 is an explanatory diagram showing an operation of the bar code reader in one embodiment of the present invention.
Figure 4:
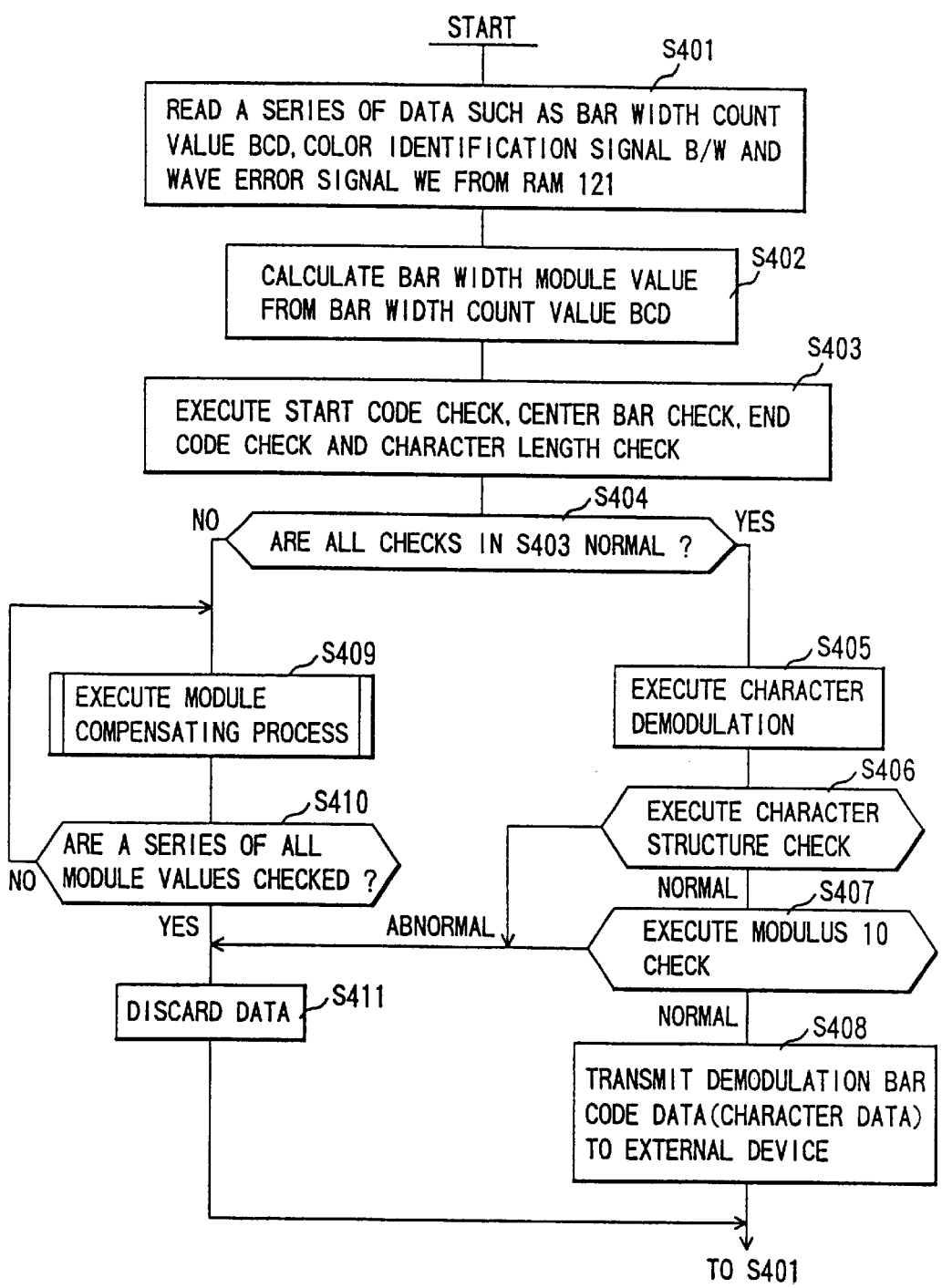
FIG. 4 is a flowchart showing a bar code recognizing/demodulating process in one embodiment of the present invention.

FIG. 4 is a diagram showing a content of the bar code recognizing/demodulating process program executed by the control circuit (CPU) 120 of the bar code recognizing/demodulating circuit 12. Referring to FIG. 4 in combination with FIGS. 1, 2 and 3, this bar code recognizing/demodulating process program starts with a switch-ON of the power supply of the bar code reader. In a first processing step S401, the data of the bar width count value BCD and the color identification signal B/W which have already been transferred from the FIFO memory circuit 11, are sequentially read from the internal RAM 121. In next S402, module values of the bar widths are calculated based on the bar width count values BCD of a series of data (a data block) read in S401. To be more specific, the bar width count value BCD on the basic minimum unit (corresponding to one module) is detected based on the read data. At the same time, it is calculated what times other bar width count values BCD are as large as the basic minimum unit bar width count value BVD (it is calculated which number of modules, 2 or 3 or 4, the bar width count value BCD corresponds to). In this example, when the bart code is normally read, as shown in FIG. 3(H), there are calculated a plurality of module values (a bar width data train) BD [3, 3, 1, 1, 1, 1, 2, 3]. Each of the calculated module values of the bar widths is temporarily stored in a work area of the RAM 121, however, a detailed explanation thereof is omitted herein. In S403, based on the plurality of module values calculated in S402, i.e., the bar width data train BD, there are effected checks collated with a bar code standard such as a start code check, an end code check, a center bar check and a character length check.

To describe it in greater details, according to the start code check, a margin (over 7 modules of the white bar) and a start guard bar (a left guard bar) LGB subsequent thereto are detected. The start guard bar LGB occupies 3 modules consisting of one module of the black bar, one module of the white bar and one module of the black bar. In the end code check, an end guard bar (a right guard bar) RGB and a margin (over 7 modules of the white bar) subsequent thereto are detected. The end guard bar RGB occupies 3 modules consisting of one module of the black bar, one module of the white bar and one module of the black bar. Further, in the center bar check, there is detected a center bar CB having 5 modules consisting of one module of the white bar, one module of the black bar, one module of the white bar, one module of the black bar and one module of the white bar. Moreover, the character length check has three categories such as a first character length check, a character length check between adjacent characters and an end character length check. In the first character length check, the start guard bar LGB or the center bar CB is compared with a width (a module value) of the first character on the basis of the plurality of module values (the bar width data train). According to the inter-adjacent-characters character length check, it is checked whether a module length of the adjacent characters is equal to a value given by 7-modules/1-character. Further, in the end character length check, the end guard bar RGB or the center bar CB is compared with a width (a module value) of the end character.

In next S404, when results of all the checks in S403 are normal, the bar width data train concerned is tentatively judged (recognized) as a normal bar code area, and the processing proceeds to S405. If the result of any one the results is abnormal, however, the control circuit 120 moves to a module compensating process in S409 each time which will hereinafter be explained. In S405, the bar width data train is sequentially converted (demodulated) into character data corresponding to a data pattern for one character (color identification signals and four pieces bar width count values corresponding to two lengths of white bars and two lengths of black bars) of the bar width data train tentatively judged as the normal bar code area in S404, and the character data is stored in the RAM 12.

In next S406, the character data defined as the demodulated bar code data stored in the RAM 121 are sequentially read character by character, thereby checking a character structure. This character structure check is a checking method for preventing misreading of the bar code together with a modulus 10 check which will hereinafter be explained. The character structure check may include an Odd/Even character structure check for distinguishing between the codes (UPC, EAN etc.) On the basis of an Odd/Even (Odd-number/Even-number) structure of each character. For instance, in a 12-digit structured UPC code, when a flag character is [4], a left-side character structure (the way of how Odd/Even numbers are arranged) is [O, E, O, O, E, E], while a right-side character structure is [E, E, E, E, E, E:. If a total sum of the numbers of modules of the black bars in each 7-module structured character is odd-numbered, the structure is [Odd]. Further, if a total sum of the numbers of modules of the white bars is even-numbered, the structure is [Even].

In next S407, the character data of the demodulated bar code data judged to be normal in the character structure check in S406, are read from the RAM 121, and the modulus 10 check is carried out. In this modulus 10 check, data of odd-numbered digits of all the digits of the demodulated bar code data are added, and data of even-numbered digits are added. Then, it is checked that a sum of a numerical value obtained by multiplying an added value of the even-numbered digit data by 3 and of an added value of the odd-numbered digit data, is a multiple of 10. If a result of the modulus 10 check is normal, in S408, the character data (the demodulated bar code data) stored in the RAM 121 are transmitted to an external device (POS) via the universal asynchronous receiver/transmitter (UART) 122.

Then, the processing loops back to S401 in order to demodulate a next series of bar codes. Further, if judged to be abnormal in S406 and S407, the data are discarded in S411, and thereafter the respective processes are returned to S401. When completing the demodulations of all the bar codes, the processing comes to an end. Now, in the judgment in S404, if the result of any one of the checks in S403 is abnormal, the bar width data train concerned is discarded in the conventional bar code reader. If the data are thus discarded, however, a reading rate when the goods is passed through at a high speed is inevitably decreased, and hence a module compensating process which will be explained next is executed in S409.

(Module Compensating Process 1)

Figure 6:
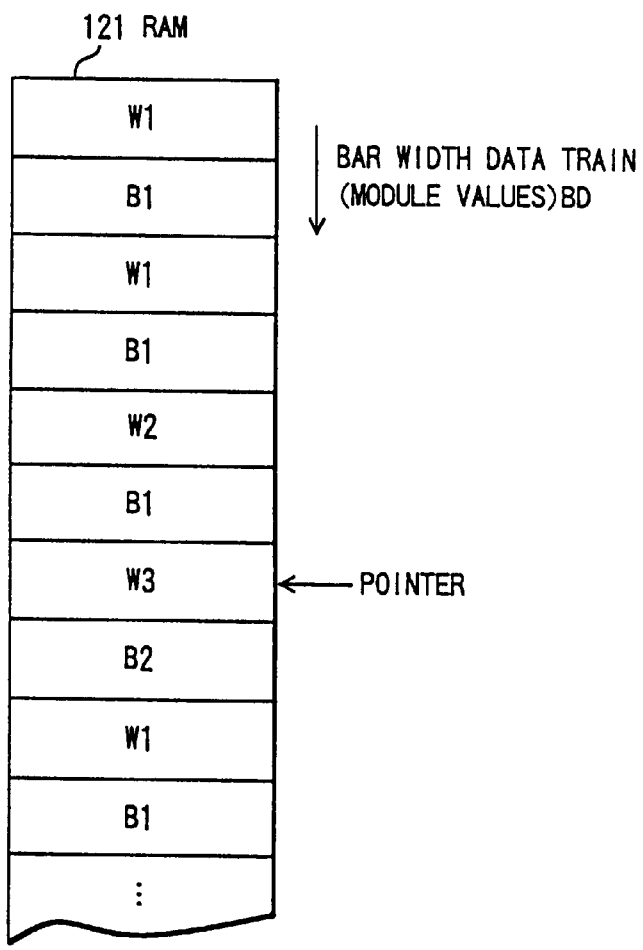
FIG. 6 is an explanatory diagram showing an operation of compensating one single 3-module bar to three lengths of 1-module bars in the first module compensating process.
Figure 6:
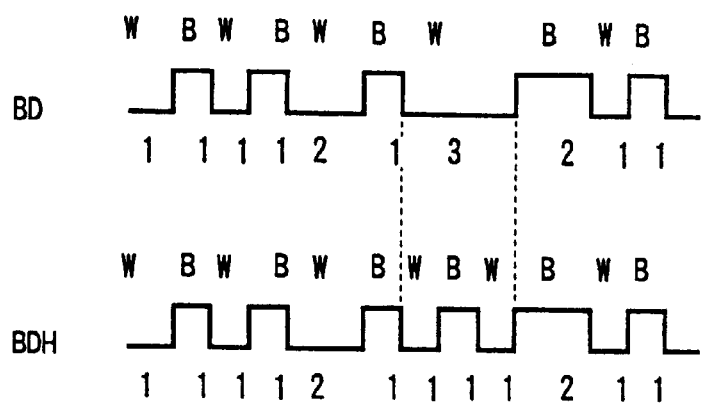

FIG. 5 shows a first example of a module compensating process S409 in the bar code recognizing/demodulating process program. Referring to FIG. 5 in combination, it is sequentially checked whether or not the module value is "3" with respect to the bar width data train judged to be abnormal in S404. In the case of the 3 modules, these 3 modules are decomposed into three pieces of one modules (three lengths of one-module bars) (S501, S502). For example, as shown in FIG. 6, if the bar width data train BD judged to be abnormal is structured such as [1-module of the black bar (B1)/3-modules of the white bar (W3)/2-modules of the black bar (B2)], the bar width data of the 3-module white bar W3 are decomposed into three lengths of 1-module bars, thus compensating the data train BD to a bar width data train BDH of [B1, W1, B1, W1, B2]. This is because an area where the white edge pulse WEG and the black edge pulse BEG are not outputted from the binarizing circuit 6, corresponds to a signal 50 segment (the timing T4 in FIG. 3(C)) of which the amplitude decreases, and mainly a plurality of 1-module bars are consecutively arranged therein. In such an area, the plurality of consecutive bars are extracted apparently as one single bar, with the result that misreading is induced.

Next, the same checking and judging processes as those in S403 and S404 are executed for the bar width data train BHD after being compensated (S503, S504). As a result, if tentatively judged to be a normal bar code area, the processing proceeds to a character demodulating process S405 on the assumption that the compensation be correct. Whereas if abnormal, it is judged in S410 whether or not a series of all pieces of bar width data are checked. If completed, the data are discarded in S411, and the processing loops back to S401. Whereas if uncompleted in S410, the processing returns to S501, wherein a pointer for pointing a location for storing the next 3-module bar width data in the RAM 121, is incremented. Then, the processes from S502 onwards are repeated.

Herein, referring back to FIG. 3, the white edge pulse WEG is not transmitted from the binarizing circuit 6 at the timing T4 due to the fact that the differential signal 50 does not exceed the (+) slice level 70 as indicted by the dotted line in FIG. 3(C) (See FIG. 3(D)). Therefore, the bar width count value BCD and the color identification signal B/W transmitted from the bar width counter 8 should normally be [100, 100, 100] and [B, W, B] but actually become such as [300] and [B] (See FIGS. 3(E) and 3(F)). As a result, the bar code recognizing/demodulating circuit 12 detects normally three lengths of bars of the bar width data (module values) BD [1, 1, 1] as one length of bar of the bar width data BD [3] (see FIG. 3(H)). According to the first module compensating process, one length bar of the bar width data BD [3] can be compensated to three lengths of 1-module bars (see FIG. 3(I)). Note that the module compensating process can be also executed on such a strict condition that the area for the compensation by decomposing the bar width data into three lengths of 1-module bars is specified to one area of the data width train (the data block).

(Module Compensating Process 2)

Figure 7:
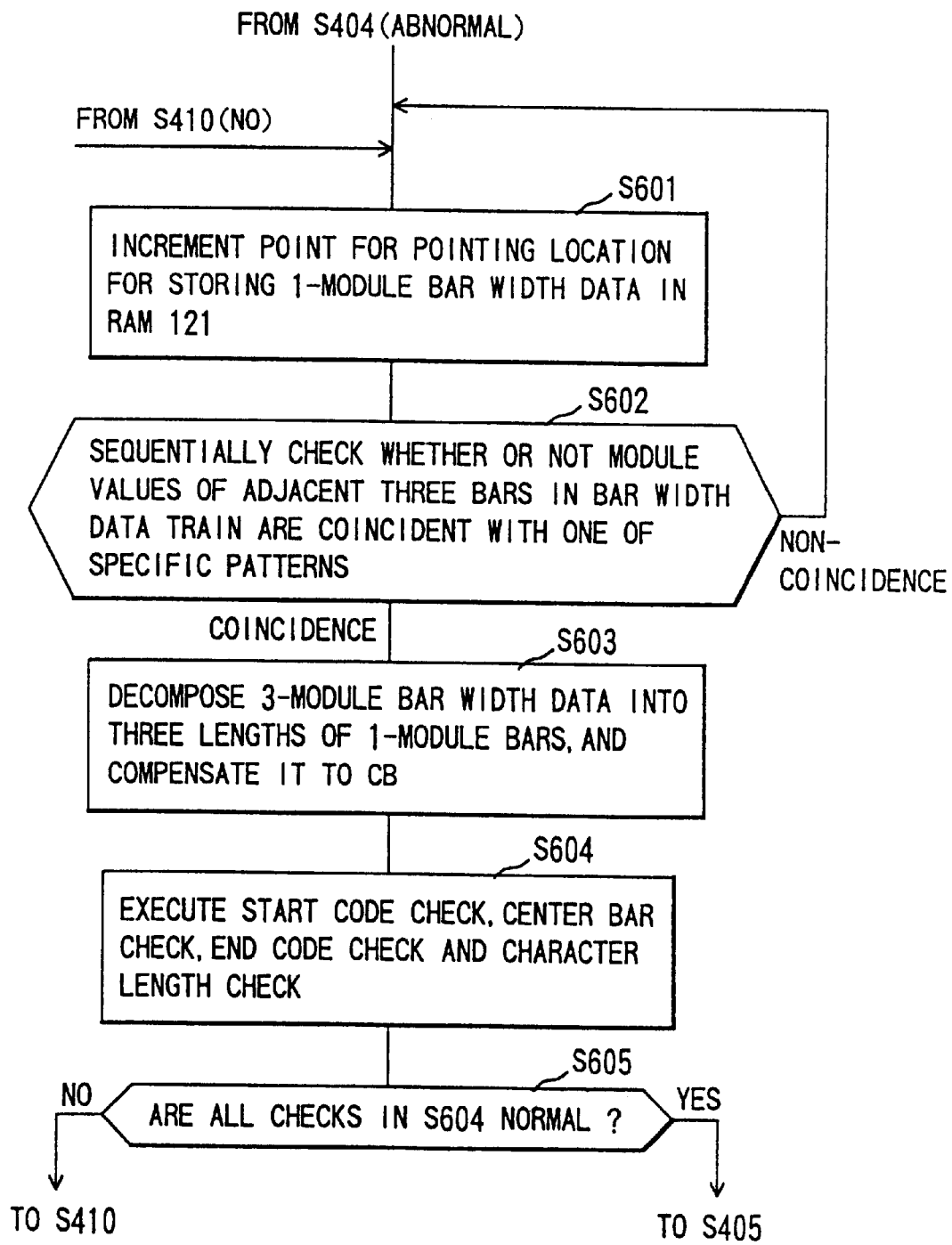
FIG. 7 is a flowchart showing a second module compensating process in the bar code recognizing/demodulating process shown in FIG. 4.
Figure 8:
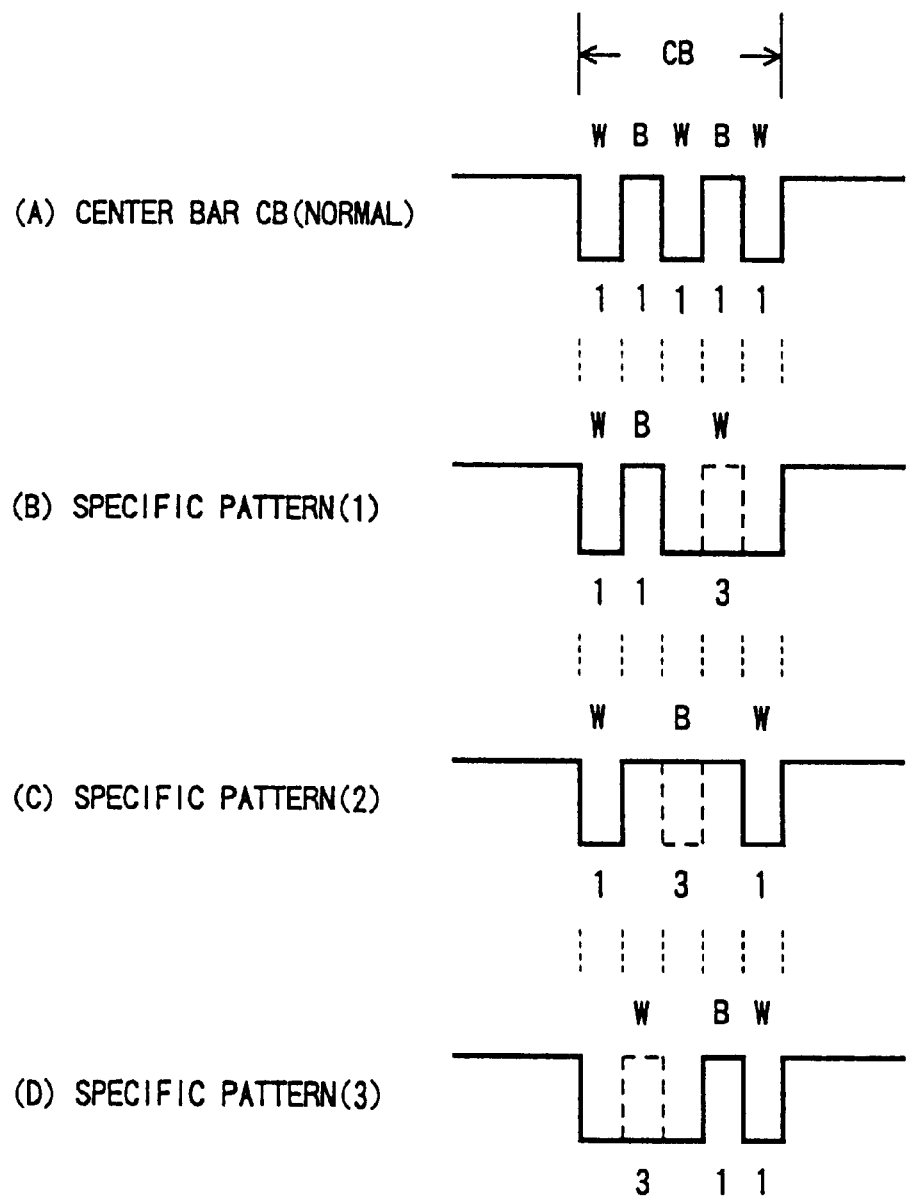
FIG. 8 is a diagram for elucidating why capable of presuming a bar width data train having a specific pattern as a center bar in the second module compensating process.

Next, FIG. 7 shows a second example of the module compensating process S409 in the bar code recognizing/demodulating process program. Referring to FIG. 7 in combination, it is sequentially checked whether or not the module values of three adjacent lengths of bars in the bar width data train judged to be abnormal in S404 are coincident with any one of the following three patterns, i.e., a specific pattern (1) [1-module of the white bar (W1)/1-module of the black bar (B1)/3-modules of the white bar (W3), a specific pattern (2) [1-module of the white bar (W1)/3-modules of the black bar (B3)/1-module of the white bar (W1), and a specific pattern (3) [3-module of the white bar (W3)/1-module of the black bar (B1)/1-module of the white bar (W1) (S601, S602). If coincident with one of these specific patterns, it is presumed to be the center bar CB, and the 3-module bar width data are decomposed into three lengths of 1-module bars. Then, the above data train is compensated to a bar width data train such as [W1, B1, W1, BE1, W1] (S603). Herein, referring to FIG. 8(A), the center bar CB when the bar code is normally read is detected as a 5-module structure such as 1-module of the white bar/1-module of the black bar/1-module of the white bar/1-module of the black bar/1-module of the white bar. If judged to be abnormal in S404 such that the bar width data train is not the normal bar code area, any one of the white edge pulse WEG and the black edge pulse BEG is not outputted from the binarizing circuit 6. It is because that area corresponds to the differential signal 50 segment having the small amplitude, and principally the plurality of 1-module bars are consecutively arranged therein. In such an area, the plurality of consecutive bars are extracted apparently as one single bar, thereby inducing the misreading. Accordingly, if the bar width data train judged to be abnormal is coincident with one of the specific patterns (1), (2) and (3), it is presumed to be the center bar CB. Hence, as shown in FIGS. 8(B), 8(C) and 8(D), the 3-module bat width data are decomposed into the three lengths of 1-module bars, and then compensated. Whereas if not coincident with any one of the specific patterns, the processing returns to S601, wherein the pointer for pointing the location for storing a next piece of 1-module bar width data in the RAM 121, is incremented. Then, the processes from S602 onwards are repeated.

Next, the same checking and judging processes as those in S403 and S404 are executed for the bar width data train BHD after being compensated (S604, S605). As a result, if tentatively judged to be a normal bar code area, the processing proceeds to the character demodulating process S405 on the assumption that the compensation be correct. Whereas if abnormal, it is judged in S410 whether or not a series of all pieces of bar width data are checked. If completed, the data are discarded in S411, and the processing comes to an end. Whereas if uncompleted in S410, the processing returns to 3601, wherein the pointer for pointing the location for storing the next 1-module bar width data in the RAM 121, is incremented. Then, the processes from S602 onwards are repeated.

(Module Compensating Process 3)

Figure 9:
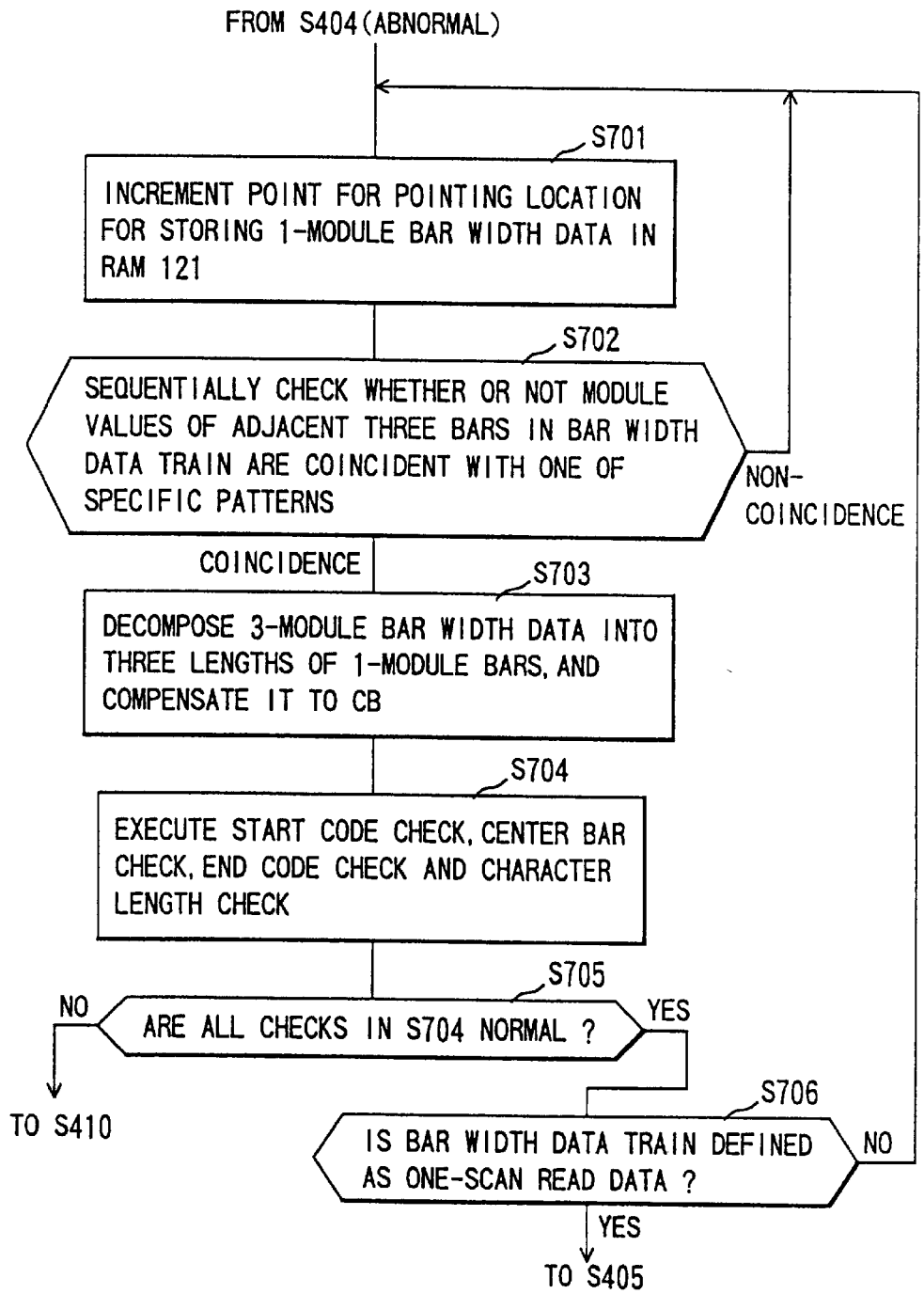
FIG. 9 is a flowchart showing a third module compensating process in the bar code recognizing/demodulating process shown in FIG. 4.

Next, FIG. 9 shows a third example of the module compensating process S409 in the bar code recognizing/demodulating process program. Referring to FIG. 9 in combination, it is sequentially checked whether or not the module values of three adjacent lengths of bars in the bar width data train judged to be abnormal in S404 are coincident with any one of the following three patterns, i.e., the specific pattern (1) [1-module of the white bar (W1)/1-module of the black bar (B1)/3-modules of the white bar (W3), the specific pattern (2) [1-module of the white bar (W1)/3-modules of the black bar (B3)/1-module of the white bar (W1), and the specific pattern (3) [3-module of the white bar (W3)/1-module of the black bar (B1)/1-module of the white bar (W1) (S701, S702). If coincident with one of these specific patterns, it is presumed to be the center bar CB for the reason elucidated in the second module compensating process, and the 3-module bar width data are decomposed into three lengths of 1-module bars, and the above data train is compensated to a bar width data train such as [W1, B1, W1, B1, W1] (S703). Whereas if not coincident with any one of the specific patterns, the processing returns to S701, wherein the pointer for pointing the location for storing a next piece of 1-module bar width data in the RAM 121, is incremented. Then, the processes from S702 onwards are repeated.

Next, the same checking and judging processes as those in S403 and S404 are executed for the bar width data train BHD after being compensated (S704, S705). As a result, if tentatively judged to be a normal bar code area, the judgement is made on a more strict condition. In this judgement, it is checked whether or not the bar width data train concerned is one-scan read data by the bar code reading method, viz., whether or not the bar width data train continues from the start guard bar LGB via the center bar CB to the end guard bar RGB without any discontinuity (whether or not it is a state of being read by one scan).

Further, as another judging method, a process of checking whether or not the above data is half-block read data, i.e., whether or not the data continues from the center bar CB to one of the start guard bar LBG and the end guard bar RGB without any discontinuity, may be adopted as a substitute therefor. Moreover, in the bar code reader incorporating functions of both of the one-scan reading method and the half-block reading method, both of the one-scan reading data check and the half-block read data check may be adopted for the judging condition.

If coincident with the condition as a result of the judgment in S706, the processing proceeds to the character demodulating process S405 on the assumption that the compensation be correct. Whereas if not coincident as the result of the judgement, the processing returns to the process in S701, wherein the pointer for pointing the location for storing the next 1-module bar width data in the RAM 121, is incremented. Then, the processes from S702 onwards are repeated. Whereas if judged to be abnormal in S705, it is judged in S410 whether or not a series of all pieces of bar width data are checked. If completed, the data are discarded in S411, and the processing loops back to S401. Whereas if uncompleted in S410, the processing returns to S701, wherein the pointer for pointing the location for storing the next 1-module bar width data in the RAM 121, is incremented. Then, the processes from S702 onwards are repeated.

(Module Compensating Process 4)

Figure 10:
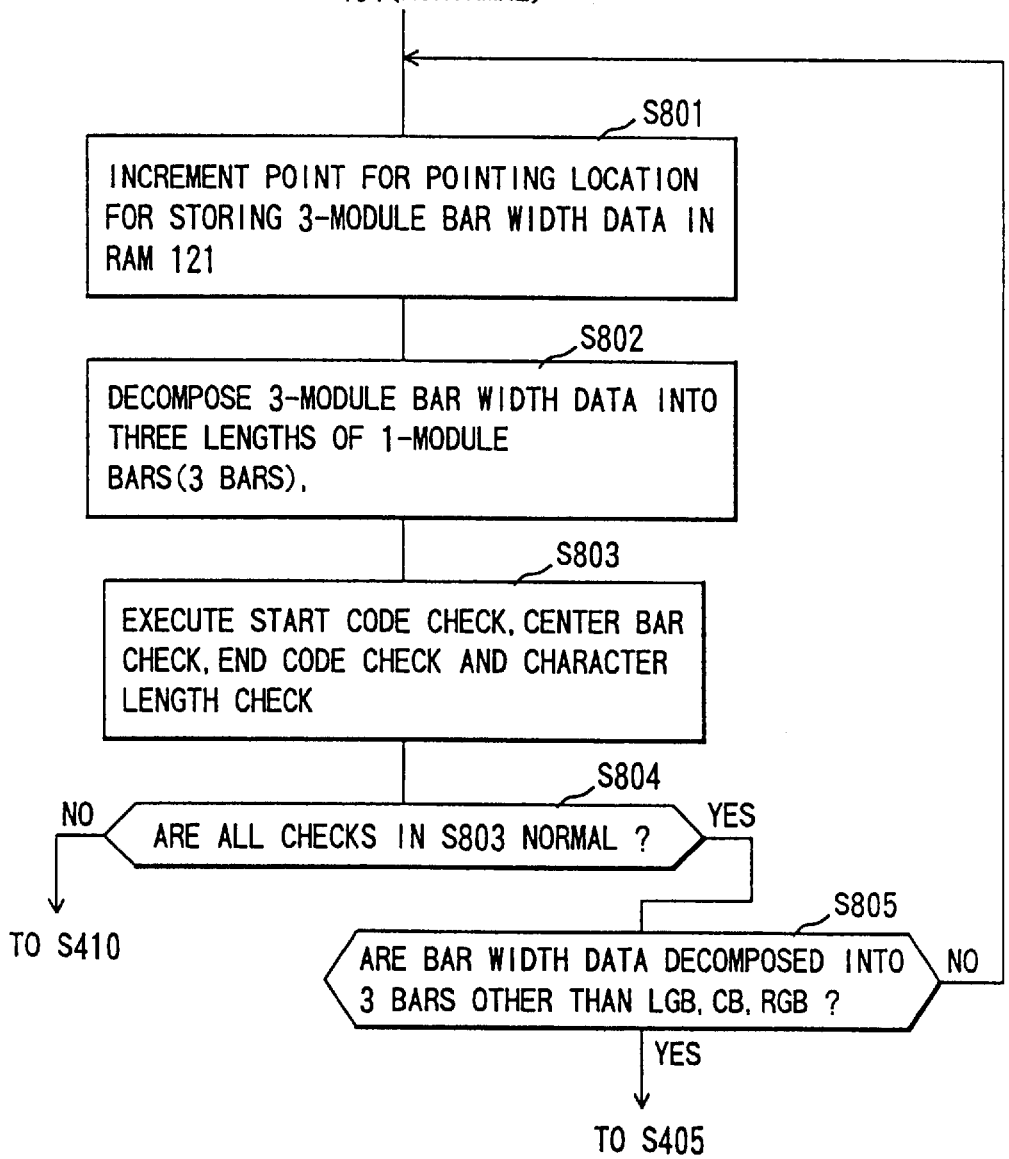
FIG. 10 is a flowchart showing a fourth module compensating process in the bar code recognizing/demodulating process shown in FIG. 4.

Next, FIG. 10 shows a fourth example of the module compensating process S409 in the bar code recognizing/demodulating process program. Referring to FIG. 10 in combination, it is sequentially checked whether or not the module value is "3" with respect to the bar width data train judged to be abnormal in S404. In the case of the 3 modules, these 3 modules are decomposed into three pieces of one modules (S801, S802). For example, if the bar width data train judged to be abnormal is structured such as [1-module of the black bar (B1)/3-modules of the white bar (W3)/2-modules of the black bar (B2)], the bar width data of the 3-module white bar W3 are decomposed into three lengths of 1-module bars, thus compensating the above data train to a bar width data train such as [B1, W1, B1, W1, B2].

Next, the same checking and judging processes as those in S403 and S404 are executed for the bar width data train after being compensated (S803, S804). As a result, if tentatively judged to be a normal bar code area, the judgement is made on a much more strict condition in S805. In this judgement, the positions where the bar width data is decomposed into the three lengths of 1-module bars in S802, are stored, and it is checked whether or not the bar width data does not correspond to any one of the start guard bar LGB, the center bar CB and the end guard bar RGB, i.e., whether or not the bar width data is the character constructive area. If coincident with the condition as a result of the judgement, the processing proceeds to the character demodulating process S405 on the assumption that the compensation be correct. Whereas if not coincident with the condition as a result of the judgement, the processing returns to the process in S801, wherein the pointer for pointing the location for storing the next 3-module bar width data in the RAM 121, is incremented. Then, the processes from S802 onwards are repeated. Whereas if judged to be abnormal in S804, it is judged in S410 whether or not a series of all pieces of bar width data are checked. If completed, the data are discarded in S411, and the processing loops back to S401. Whereas if uncompleted in S410, the processing returns to S801, wherein the pointer for pointing the location for storing the next 3-module bar width data in the RAM 121, is incremented. Then, the processes from S802 onwards are repeated.

(Module Compensating Process 5)

Next, a fifth example of the module compensating process S409 in the bar code recognizing/demodulating process program will be explained. As indicated by the dotted line in FIG. 3(C), when the bar code is abnormally read, an amplitude of the differential signal 50 outputted from the differentiating circuit 5 is under the (+) slice level 70 at the timing T4. Normally, the differential signal 50 must be outputted with an amplitude exceeding the (+) slice level 70 in order to correspond to the point of change from the black bar Bb to the white bar Wb of the abr code 30, however, the above phenomenon occurs due to an influence of noises when reading the bar code. As a consequence, the binarizing circuit 6 does not output the white edge pulse WEG at the timing T4.

Figure 11:
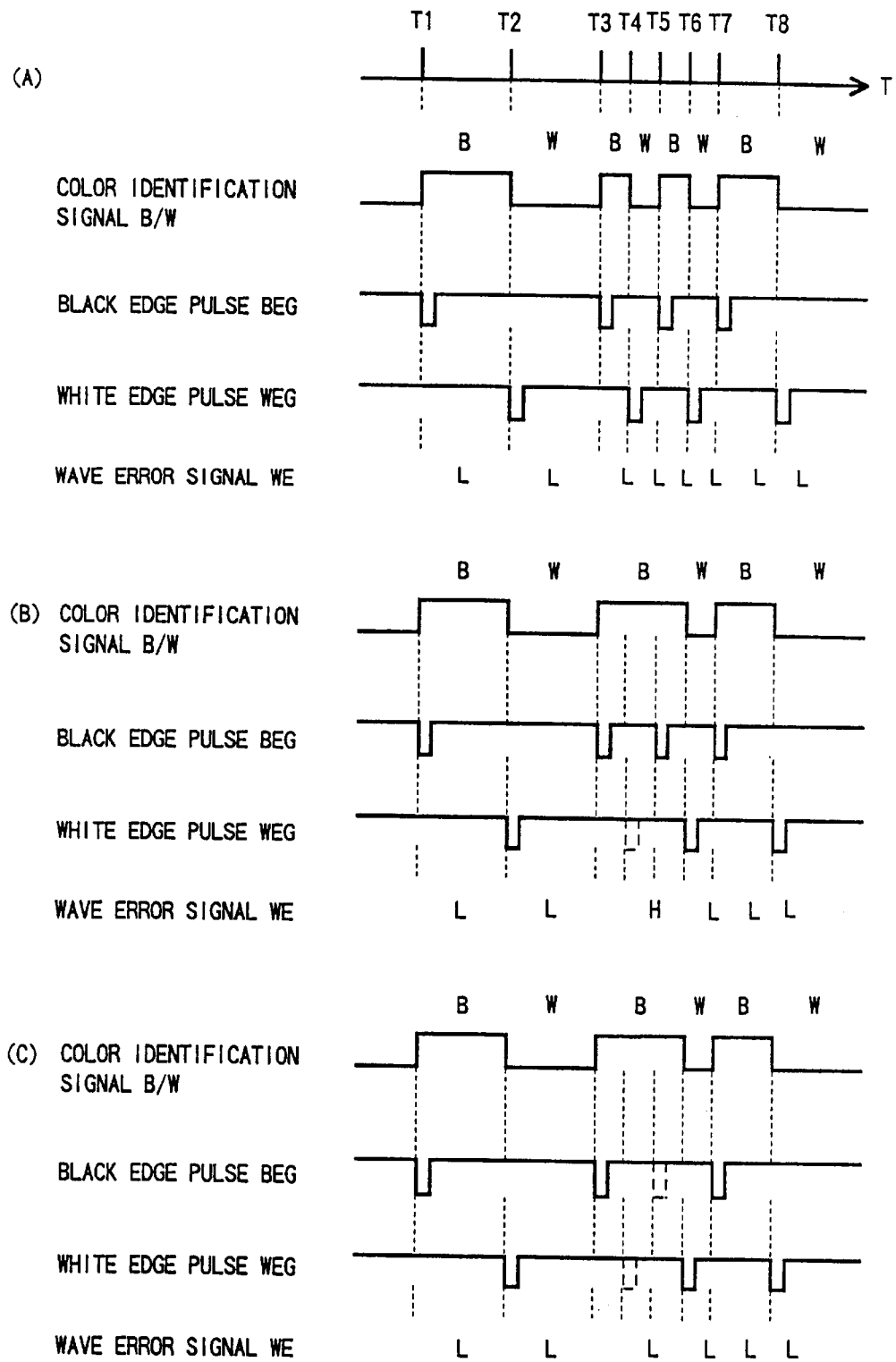
FIG. 11 is an explanatory diagram showing a wave error signal in a fifth module compensating process.

The wave error detecting circuit provided in the bar width counter 8, as shown in FIG. 3 and in much greater details in FIG. 11, in a case where there is inputted consecutively twice one of the black edge pulse BEG and the white edge pulse WEG that are to be alternately inputted when the bar code is normally read, the wave error signal WE assuming the logic [H(1)] level is outputted. Accordingly, the wave error detecting circuit receives consecutively twice the black edge pulse BEG at the timings T3 and T5 from the binarizing circuit 6, and therefore, as shown in FIG. 3(G) and FIG. 11(B), outputs the wave error signal WE of the logic [H(1)] level. Further, the bar width counter 8 starts its counting operation from the black edge pulse BEG at the timing T3, and finishes the counting operation when the white edge pulse WEG is inputted at the timing T6, and, as shown in FIGS. 3(E) and 3(F), outputs the bar width count value BCD[30] and the color identification signal B/W[B] corresponding to the 3-module black bar.

The bar code recognizing/demodulating circuit 12 reads, from the internal RAM 121, the bar width count value BCD [300], the color identification signal B/W[B] and the wave error signal WE[H] outputted from the bar width counter 8 via the filter circuit 10 and the FIFO memory circuit 11, and executes the module compensating process. The module compensating process in the bar code recognizing/demodulating circuit 12 is based on the following concept. The control circuit (CPU) 120, when decomposing the single 3-module bar into three lengths of 1-module bars in the module compensating process based on the bar code recognizing/demodulating process program, checks whether or not the wave error signal WE takes the logic level [H]. The CPU 120 is capable of judging at a certain degree of probability whether or not the bar width data of the single 3-module bar is the normal bar width data corresponding to the 3 modules or the apparent bar width data corresponding to the 3 modules as a result of the fact that the amplitude of the differential signal 50 is under the slice level due to the noise influence when bar code is read, by checking a state of the wave error signal WE (see FIG. 3(H)). The CPU 120 is thereby capable of compensating the apparent bar width data corresponding to the 3 modules into the three lengths of 1-module bars (see FIG. 3(I)).

Herein, the reason why capable of making the judgement at a certain degree of probability is that when the wave error signal WE takes the logic level [H], as already explained referring to FIG. 3, there become the apparent 3 modules. When the wave error signal WE takes a logic level [L], however, that is, when in such an abnormal bar code reading process that the black edge pulse BEG, for example, at the timing T5 shown in FIG. 3(D) is not outputted together with the white edge pulse WEG (when in a state indicated by the dotted line as shown in much greater details in FIG. 11(C)), the CPU 120 is unable to judge whether the modules are the normal 3 modules or the apparent 3 modules because of the wave error signal WE being undetected.

Figure 12:
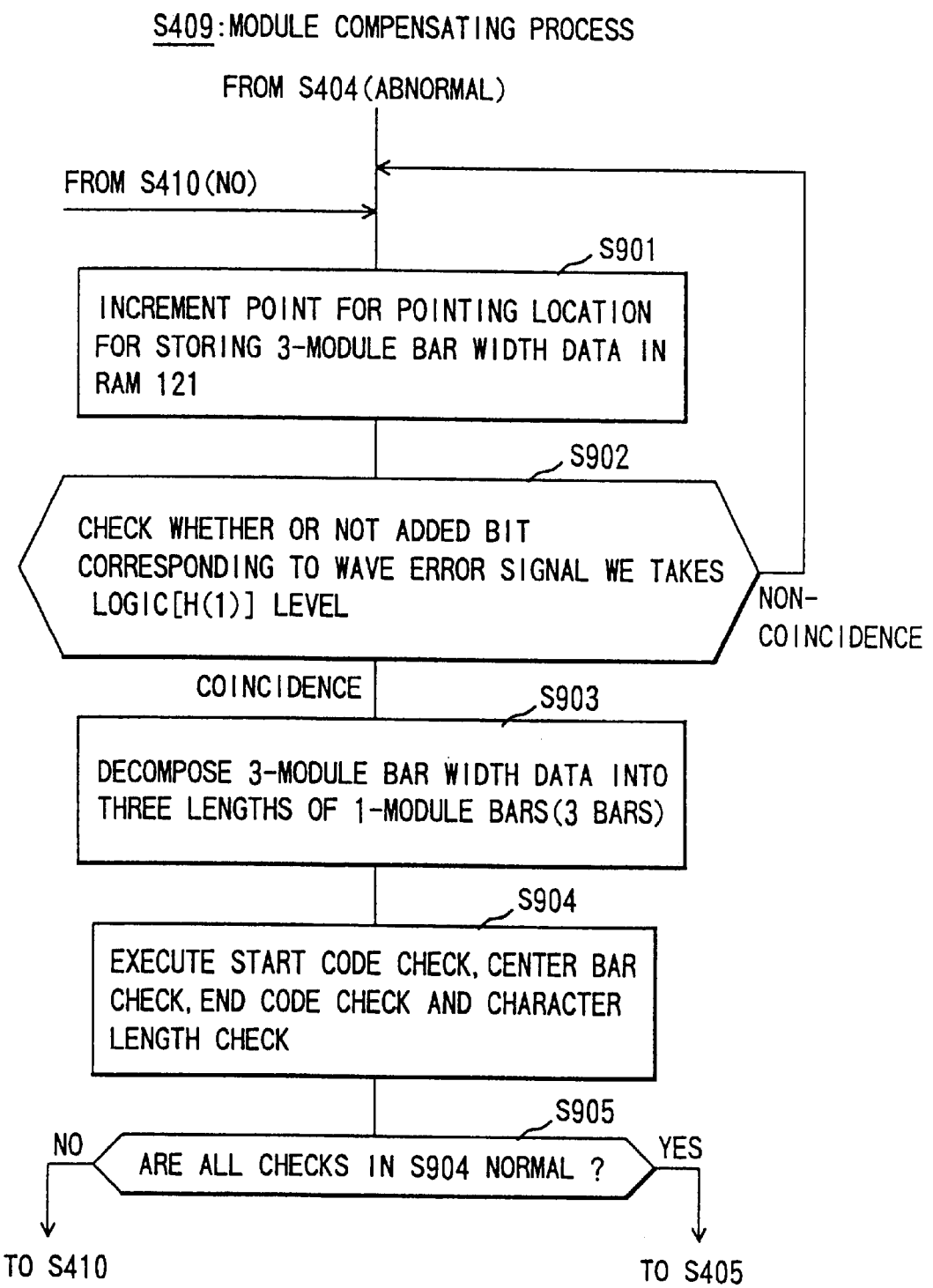
FIG. 12 is a flowchart showing the fifth module compensating process in the bar code recognizing/demodulating process shown in FIG. 4.

Referring to FIG. 12 in combination, it is sequentially checked whether or not the module value is "3" with respect to the bar width data train judged to be abnormal in S404 in the bar code recognizing/demodulating process program, and whether or not an added bit corresponding to the wave error signal WE is a [1] signal indicating the logic level [H] (S901, S902). If this added bit is not the [1] signal, the pointer for pointing the location for storing the next 3-module bar width data in the RAM 121, is incremented. Then, the processes from S902 onwards are repeated. If the added bit is the [1] signal, the bar width data of the corresponding single 3-module bar is decomposed into three lengths of 1-module bars (3 bars) (S903). For instance, if the bar width data train judged to be abnormal is [1-module of the black bar (B1)/3-modules of the white bar (W3)/2-modules of the black bar (B2)], the bar width data of the 3-module white bar W3 are decomposed into three lengths of 1-module bars, thus compensating the above data train to a bar width data train such as [B1, W1, B1, W1, B2]. Next, the same checking and judging processes as those in S403 and S404 are executed for the bar width data train after being compensated (S904, S905). As a result, if tentatively judged to be a normal bar code area, the processing proceeds to the character demodulating process S405 on the assumption that the compensation be correct.

Whereas if abnormal, it is judged in S410 whether or not a series of all pieces of bar width data are checked. If completed, the data are discarded in S411, and the processing loops back to S401. Whereas if uncompleted in S410, the processing returns to S901, wherein the pointer for pointing the location for storing the next 3-module bar width data in the RAM 121, is incremented. Then, the processes from S902 onwards are repeated. Incidentally, in this module compensating process, in addition to the bar width count value BCD and the color identification signal B/W, the wave error signal WE is read from the RAM 121 in S401.

One embodiment of the present invention has been discussed by exemplifying the case where the 3-module bar apparently misread as one single bar is compensated to three lengths of 1-module bars. The present invention may take, however, a method of compensating, e.g., a 4-module bar to three lengths of 1-module and 2-module bars (i.e., the bar width data [1, 2, 1] or [2, 1, 1]).

Although only a few embodiments of this invention have been described in detail above, those skilled in the art will readily appreciate that many modifications are possible in the preferred embodiments without departing from the novel teachings and advantages of this invention. Accordingly, all such modifications are intended to be included within the scope of this invention as defined by the following claims.

What is claimed is:

1. A bar code reader for reading a bar code composed of a plurality of white bars and a plurality of black bars, comprising:
   a generating unit for generating bar width values respectively showing a width of the read bars;
   a judging unit for judging based on the bar width values whether or not the read bar code satisfies a predetermined standard condition; and
   a converting unit for converting the read bars into a plurality of bars in which a black-and-white-inverted bar is interposed between the conversion-target color bars, when said judging unit judges that the bar code does not satisfy the predetermined standard condition,
   wherein said judging unit makes a re-judgement of the bar code in which the read bar is converted.

2. A bar code reader according to claim 1, wherein said converting unit converts the conversion-target bar into a plurality of bars each corresponding to a width of a multiple of a basic minimum unit width.

3. A bar code reader according to claim 1 or 2, wherein said converting unit makes the conversion effective if the plurality of converted bars do not correspond to any one of a start guard bar, a center bar and an end guard bar of the bar code.

4. A bar code reader according to claim 1 or 2, wherein said converting unit sets an area for the conversion into the plurality of bars to only one area of the bar code.

5. A bar code reader for reading a bar code composed of a plurality of white bars and a plurality of black bars, comprising:
   a generating unit for generating bar width values respectively showing a width of the read bars; and
   a judging unit for making a judgement of a pattern of the read bar code that the read pattern is an area corresponding to a center bar of the bar code in a case where the read pattern has one single white bar and one single black bar each having a basic minimum unit width, and a white bar or a black bar having a width that is three times as large as the basic minimum unit width.

6. A bar code reader for reading a bar code composed of a plurality of white bars and a plurality of black bars, comprising:
   a generating unit for generating bar width values respectively showing a width of the read bars; and
   a judging unit for making a judgement of a pattern of the read bar code that the read pattern is an area corresponding to a center bar of the bar code in a case where the read pattern has two white bars each having a basic minimum unit width, and a black bar having a width that is three times as large as the basic minimum unit width.

7. A bar code reader according to claim 6, wherein the black bar is interposed between the two white bars.

8. A bar code reader according to claim 5 or 6, wherein the judgement by said judging unit is made effective when a whole bar code is read by a single scan.

9. A bar code reader according to claim 5 or 6, wherein the judgement by said judging unit is made effective when a section of a bar code between a start guard bar and the center bar, or a section of a bar code between the center bar and an end guard bar is read by a single scan.

10. A bar code reader for reading a bar code by receiving reflected light beams from the bar code having bright areas and dark areas, comprising:
    a generating unit for generating a bright/dark pattern signal having an amplitude corresponding to a quantity of the light received;

a first detecting unit for detecting a first point of change from the bright area to the dark area of the bright/dark pattern signal, and a second point of change from the dark area to the bright area of the bright/dark pattern signal;

second detecting unit for detecting whether or not the first point of change or the second point of change is consecutively detected; and a converting unit for converting a read bar corresponding to the consecutively detected points of change into a plurality of bars in which a black-and-white-inverted bar is interposed between the conversion-target color bars, when said second detecting unit consecutively detects the first point of change or the second point of change.

11. A bar code reading method of reading a bar code composed of a plurality of white bars and a plurality of black bars, comprising:

a first step of generating bar width values respectively showing a width of the read bars;

a second step of judging based on the bar width values whether or not the read bar code satisfies a predetermined standard condition; and a third step of converting the read bars into a plurality of bars in which a black-and-white-inverted bar is interposed between the conversion-target color bars, when judging in said second step that the bar code does not satisfy the predetermined standard condition, wherein a re-judgement of the bar code in which the read bar is converted is made in said second step.

12. A bar code reading method of reading a bar code composed of a plurality of white bars and a plurality of black bars, comprising:

a first step of generating bar width values respectively showing a width of the read bars; and a second step of making a judgement of a pattern of the read bar code that the read pattern is an area corresponding to a center bar of the bar code in a case where the read pattern has one single white bar and one single black bar each having a basic minimum unit width, and a white bar or a black bar having a width that is three times as large as the basic minimum unit width.

13. A bar code reading method of reading a bar code composed of a plurality of white bars and a plurality of black bars, comprising:

a first step of generating bar width values respectively showing a width of the read bars; and a second step of making a judgement of a pattern of the read bar code that the read pattern is an area corresponding to a center bar of the bar code in a case where the read pattern has two white bars each having a basic minimum unit width, and a black bar having a width that is three times as large as the basic minimum unit width.

14. A bar code reading method of reading a bar code by receiving reflected light beams from the bar code having bright areas and dark areas, comprising:

a first step of generating a bright/dark pattern signal having an amplitude corresponding to a quantity of the light received;

a second step of detecting a first point of change from the bright area to the dark area of the bright/dark pattern signal, and a second point of change from the dark area to the bright area of the bright/dark pattern signal;

a third step of detecting whether or not the first point of change or the second point of change is consecutively detected; and a fourth step of converting a read bar corresponding to the consecutively detected points of change into a plurality of bars in which a black-and-white-inverted bar is interposed between the conversion-target color bars, when the first point of change or the second point of change is consecutively detected in said third step.

* * * * *